United States Patent
Hyndman

(10) Patent No.: US 9,149,027 B2
(45) Date of Patent: Oct. 6, 2015

(54) JIG BODY AND HOOK ASSEMBLY FOR USE WITH SOFT PLASTICS

(75) Inventor: David Hyndman, Miami (AU)

(73) Assignee: DOTDAN PTY LTD., Queensland (AU)

( * ) Notice: Subject to any disclaimer, the term of this patent is extended or adjusted under 35 U.S.C. 154(b) by 191 days.

(21) Appl. No.: 13/820,046

(22) PCT Filed: Aug. 31, 2010

(86) PCT No.: PCT/AU2010/001119
§ 371 (c)(1),
(2), (4) Date: Mar. 21, 2013

(87) PCT Pub. No.: WO2012/027771
PCT Pub. Date: Mar. 8, 2012

(65) Prior Publication Data
US 2013/0174468 A1 Jul. 11, 2013

(51) Int. Cl.
*A01K 85/00* (2006.01)
*A01K 83/06* (2006.01)
*A01K 83/00* (2006.01)

(52) U.S. Cl.
CPC ............... *A01K 83/06* (2013.01); *A01K 83/00* (2013.01); *A01K 85/00* (2013.01)

(58) Field of Classification Search
CPC ........ A01K 83/06; A01K 83/00; A01K 85/00
USPC ............... 43/44.2, 44.8, 42.39, 44.81, 42.24, 43/42.15
IPC ............................................ A01K 85/00, 83/06
See application file for complete search history.

(56) References Cited

U.S. PATENT DOCUMENTS

| 2,437,549 A * | 3/1948 | Pecher ................... 43/42.36 |
| 2,741,057 A * | 4/1956 | Morris et al. ............. 43/42.09 |
| 2,820,314 A * | 1/1958 | Scott ..................... 43/42.1 |
| 4,791,749 A | 12/1988 | Stazo |
| 4,819,366 A * | 4/1989 | Manno .................. 43/44.81 |
| 5,491,927 A * | 2/1996 | Ortiz ................... 43/42.28 |
| 5,899,015 A * | 5/1999 | Link .................... 43/42.39 |
| 8,713,848 B2 * | 5/2014 | Huppert ................. 43/43.14 |
| 2010/0126058 A1* | 5/2010 | Hughes ................ 43/42.39 |

FOREIGN PATENT DOCUMENTS

| JP | 09-285245 | 11/1997 | |
| JP | 2000201573 A * | 7/2000 | ............ A01K 83/06 |
| JP | 2002153167 A * | 5/2002 | ............ A01K 85/00 |

OTHER PUBLICATIONS

International Preliminary Report on Patentability mailed Mar. 5, 2013 in corresponding International Application No. PCT/AU2010/001119.

* cited by examiner

*Primary Examiner* — Kathleen Alker
(74) *Attorney, Agent, or Firm* — MH2 Technololgy Law Group

(57) ABSTRACT

A jig body adapted to at least temporarily mount a soft plastic lure relative thereto is provided. The jig body includes an elongate shank, a line attachment portion relative to a first end of the elongate shank, a hook mounting element along the length of the shank, a soft plastic lure retention portion, and at least one portion of positive or negative buoyancy.

17 Claims, 3 Drawing Sheets

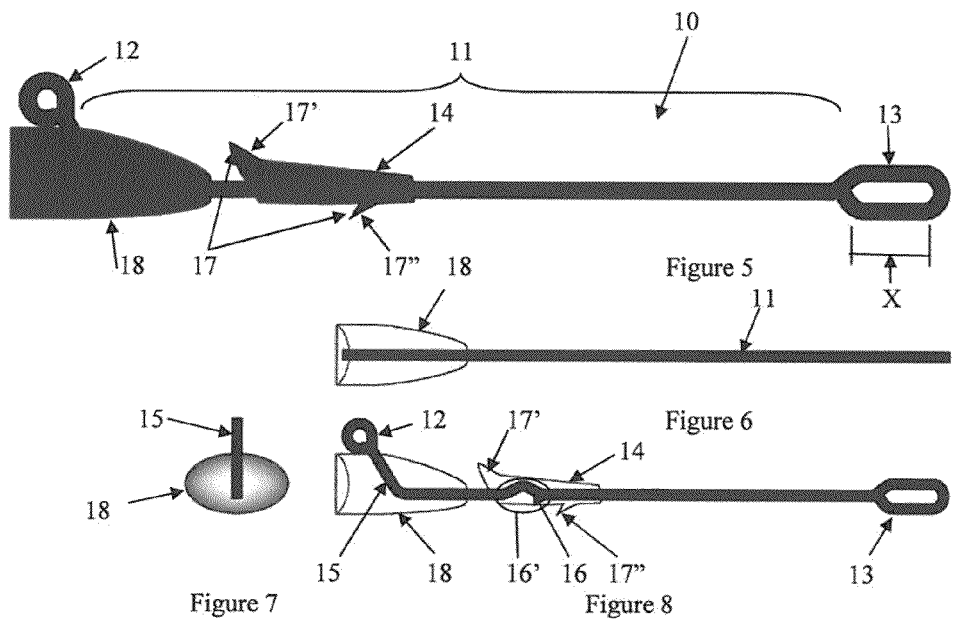
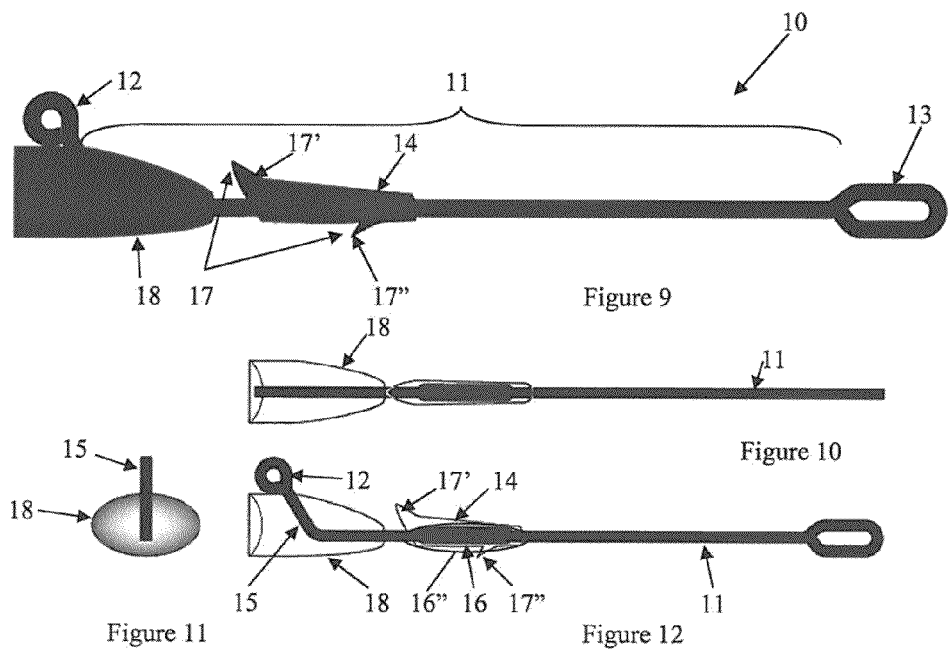

JIG BODY AND HOOK ASSEMBLY FOR USE WITH SOFT PLASTICS

CROSS-REFERENCE TO RELATED APPLICATIONS

This application is a United States national phase application under 35 U.S.C. §371 of International Patent Application No. PCT/AU2010/001119 filed on Aug. 31, 2010, which is herein incorporated in its entirety by reference. The International Application was published as International Publication No. WO 2012/027771 on Mar. 8, 2012.

FIELD OF THE INVENTION

The present invention relates to fishing tackle and particularly a jig body and hook assembly for use with soft plastic lures.

BACKGROUND ART

Any lure made of a soft, rubbery material is classified in the soft plastic lure range these days. The life like action of soft plastics, combined with versatility in rigging and price, makes them extremely popular.

Soft plastic lures are normally rigged using a jig to which the soft plastic lure body and a hook assembly is either connected or is integrally formed.

It is very important to put a soft plastic lure body on the hook properly.

The plastic bait must lay straight and not be bunched up and the hook must be central in the bait or it will interfere with the action and not swim correctly. The soft plastic bait must have action both as it sinks and as it is retrieved to be really successful. Some baits if not correctly rigged will still swim in a fashion on the retrieve but do nothing or just spiral as they sink.

The tail of the soft plastic lure should still work hard as they sink as a lot of bream especially will strike as it is sinking provided it looks lifelike. Start by measuring your soft plastic bait alongside the jig head and take note of where the hook will need to exit the body in order for it to be straight and not bunched or stretched when the front of it is sitting against the head of the jig.

Most plastics have a seam running along the centre in line with the tail so this shows where the hook needs to come through to be central and line up with the tail as well. Start the hook point in the centre of the plastic and thread it round the hook making sure to keep it central and bring the hook point out through the seam.

There are a variety of jigs on the market and examples of the commercially available jigs are illustrated in FIGS. 1 to 4.

It will be clearly understood that, if a prior art publication is referred to herein, this reference does not constitute an admission that the publication forms part of the common general knowledge in the art in Australia or in any other country.

SUMMARY OF THE INVENTION

The present invention is directed to a jig body and hook assembly, which may at least partially overcome at least one of the abovementioned disadvantages or provide the consumer with a useful or commercial choice.

With the foregoing in view, the present invention in one form, resides broadly in a jig body adapted to at least temporarily mount a soft plastic lure relative thereto, the jig body including an elongate shank, a line attachment portion relative to a first end of the elongate shank, a hook mounting means along the length of the shank, a soft plastic lure retention portion, and at least one portion of positive or negative buoyancy.

According to an alternative embodiment, the invention resides in a jig body and hook assembly, the jig body including an elongate shank, a line attachment portion relative to a first end of the elongate shank, a hook mounting means along the length of the shank, a soft plastic lure retention <'> portion, and at least one portion of positive or negative buoyancy and the hook having a forward point, an elongate shank and a blind eye including an enlarged portion spaced along the elongate shank from the forward point.

According to an alternative embodiment, the invention resides in a hook for a jig, the hook having a forward point; an elongate shank and a blind eye including an enlarged portion spaced along the elongate shank from the forward point.

The elongate shank of the jig body will preferably be of unitary construction. The elongate shank is normally manufactured of wire or similar material in order to be substantially rigid but still have an element of resilience. Typically, the resilience will be provided by the material used for construction, typically due to the dimension of the material being small enough to be deformed.

The elongate shank will typically be substantially straight with a preferred embodiment including an upturned forward end. Preferably, the forward end of the elongate shank will be provided at an angle to the main body typically between 15° and 80° from the plane of the main body and preferably approximately 60°. The preferred forward portion of the elongate shank extends upwardly such that the upturned forward end lies in the same plane as the remainder of the elongate shank when viewed from above.

The elongate shank may be provided with a retaining portion. Typically, the retaining portion is provided in order to retain or position the soft plastic lure retention portion relative to the elongate shank.

Either one of two preferred embodiment of retaining portion will typically be provided, namely a bend or kink in the elongate shank or a squashed or flattened portion of the elongate shank.

Regardless of which of the two preferred embodiment of retaining portion are provided, the retaining portion will normally be provided toward the forward or head end of the elongate shank, but spaced from the head end. Typically, the retaining portion will be located at a position between one quarter to one third of the length of the shank from the head end.

The jig body includes a line attachment portion relative to a first end of the elongate shank. Typically, the line attachment portion will include an eye or other type of opening through which a portion of fishing line or other attachment device can extend in order to attach the jig body relative to an elongate fishing line, trace or the like.

Typically, the line attachment portion is formed integrally with the shank, with the forward free end of the shank bent back on itself to define the opening.

Again, the line attachment portion is typically formed in the same plane as the remainder of the elongate shank when view from above.

The line attachment portion may have a more complex configuration such as an opening which is rotatably associated with the remainder of the shank or alternatively with an openable catch, as two examples.

The line attachment portion is typically provided at or toward the forward end of the shank, normally at the end of the preferred upturned forward end portion.

The jig body also includes a hook mounting means along the length of the shank. The hook mounting means may be provided at any location along the shank. One or more hook may be provided. According to a particularly preferred embodiment, at least one hook mounting means is provided at the end of the elongate shank opposite the line attachment portion.

The hook mounting means will typically include means to attach one or more hooks relative to the elongate shank, whether temporarily or substantially permanently.

According to a preferred embodiment, the hook mounting means will preferably include an elongate opening. Preferably, the elongate opening is of fixed dimension. The elongate opening is typically dimensioned and adapted to receive and pass a hook with a barb therethrough when correctly aligned and to prevent removal of the hook with the barb when not aligned.

Normally, the hook mounting means will be formed integrally with the elongate shank by bending the elongate shank back upon itself. As with the line attachment portion, the opening is preferably an opening with a closed or substantially closed periphery.

Again, the hook mounting means will preferably be formed so that it is coplanar with the elongate shank when viewed from above. The width of the hook mounting means is preferably minimised as it will normally be forced through the soft plastic lure when assembling the lure.

Whilst the line attachment portion may be associated with the elongate shank in a rotatable configuration, it is particularly preferred that the hook mounting means will be fixed or formed integrally with the elongate shank order to ensure the orientation of the hook mounting means (and thereby preferably the orientation of the hook) relative to the remainder of the shank and/or the line attachment portion. This will preferably limit the possibility that the hook or soft plastic lure will be poorly presented when in use.

The jig body of the present invention includes a soft plastic lure retention portion. As mentioned above, the soft plastic lure retention portion is typically formed over the retaining portion of the shank. Preferably, the soft plastic lure retention portion is over moulded over the retention portion of the shank in order that the retention portion fixes the position of the soft plastic lure retention portion along the shank.

The soft plastic lure retention portion may be provided with at least one barb or similar in order to allow forced passage of the elongate shank (or at least a portion thereof) through a soft plastic lure, but to prevent removal of the soft plastic lure from the jig body in the opposite direction.

Typically, any barbs or similar that are provided, are provided facing in a single direction. Typically, there is one larger barb and one smaller barb provided. Normally, the larger barb is provided facing upwardly in substantially the same plane as the upturned forward end of the shank and the smaller barb is provided facing downwardly in substantially the same plane.

Normally, both barbs diverge in the forward direction so that the soft plastic lure can be forced on to the jig body from the rear but not removed from the rear for example such as when a fish strikes.

The jig body of the present invention includes at least one portion of positive or negative buoyancy. The at least one portion of positive or negative buoyancy may be provided as a block or portion of material attached or otherwise associated with the jig body more or less permanently, or alternatively, an assembly may be provided such as a containing volume into which material of a positive or negative buoyancy can be selectively located, thereby allowing the buoyancy of the jig body to be changed as desired.

Preferably, there is at least one portion of positive or negative buoyancy. Normally, at least one portion is provided at or adjacent the head end elongate shank. Typically, this head portion of positive or negative buoyancy is over moulded about the shank evidently portion of the outstanding forward end of the shank leaving the line attachment portion unobstructed. This head portion is typically enlarged and will act to prevent the soft plastic lure moving forwardly on the shank.

The portion(s) of positive or negative buoyancy will preferably be shaped. The shapes used can be to resemble portions of the bait such as for example to resemble the head of a bait fish from the side or alternatively, can be shaped to reduce drag in a forward direction to ease retrieval of the assembled lure. "Eyes" or other pattern or ornamentation may be applied to the head portion.

Preferably, the soft plastic retaining portion may be formed as a portion of positive or negative buoyancy as well. Typically, the soft plastic retaining portion will be of the same type as the head portion. Typically, both the soft plastic retaining portion and the head portion are provided as either a positively buoyant portion or negatively buoyant portion. It is less desirable to have the soft plastic retaining portion and the head portion provided as different types of portions.

Typically, whether the portion is positively buoyant or negatively buoyant is dependent upon whether the lure is intended to be a sinking lure (one used beneath the water) or a floating lure. It is to be noted that some lures which are designed as "floating" lures can dive beneath the water surface due to the provision of an angled bill of the lure which drives the lure beneath the water surface as it is retrieved.

The hook of the preferred embodiment typically includes a point, a shank and a blind eye. Normally, a portion of the shank is arcuate or curved with the point of a hook located at the free end of the curved portion. The blind eye will preferably be provided towards, and normally at, the opposite end of the shank to the point.

The blind eye will preferably be provided at the end of an arcuate portion which is oriented approximately perpendicular to the plane of the shank of the hook and the point which are normally in substantially the same plane or only very slightly offset from one another.

Normally, the enlarged portion is provided at the free end of the arcuate portion.

The blind eye of the hook is typically configured as an enlarged portion designed to allow passage of the point and shank through an eye or similar opening and the enlarged portion prevents complete passage of the shank through the eye by abutting the periphery of the eye. Typically, this is achieved by providing the blind eye as an enlarged bulbous portion.

The bulbous portion may have any configuration or shape provided that it is fit for the purpose of preventing complete passage of the shank of the hook through the eye.

Typically, the hook of this nature is attached to the hook mounting means on the preferred jig body by orienting the barb of the hook point with the long dimension of the elongate eye preferred and then pushing the remainder of the shank through the eye until the enlarged bulb abuts the periphery of the eye. Unless the barb of the hook is aligned with the long dimension, passage of the barb though the eye is not possible. This will allow a user to swap the hook on the jig relatively easily but be confident that the hook will not accidentally come loose. Similarly, the enlarged bulb will not allow the hook to pass completely.

According to an alternative embodiment, the invention resides in a lure including an elongate shank, a line attachment portion relative to a first end of the elongate shank, and a hook mounting opening along the length of the shank adapted to at least temporarily mount a hook thereto, the hook mounting opening elongate and sized to allow passage of a hook and barb when aligned with the elongate dimension of the opening but not when in any other configuration.

Any of the features of the invention disclosed herein may be claimed in any combination with any of the other features.

BRIEF DESCRIPTION OF THE DRAWINGS

Various embodiments of the invention will be described with reference to the following drawings, in which:

FIG. 5 is a schematic side view of a jig body according to a first preferred embodiment of the present invention.

FIG. 6 is a schematic top view of a jig body as illustrated in FIG. 5.

FIG. 7 is a schematic end view of a jig body as illustrated in FIG. 5.

FIG. 8 is a schematic transparent side view of a jig body as illustrated in FIG. 5.

FIG. 9 is a schematic side view of a jig body according to a second preferred embodiment of the present invention.

FIG. 10 is a schematic transparent top view of a jig body as illustrated in FIG. 9.

FIG. 11 is a schematic end view of a jig body as illustrated in FIG. 9.

FIG. 12 is a schematic transparent side view of a jig body as illustrated in FIG. 9.

DETAILED DESCRIPTION OF THE PREFERRED EMBODIMENT

Figure 1:
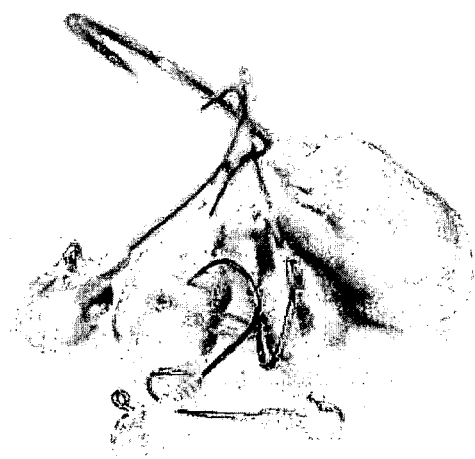
FIGS. 1 to 4 illustrated conventional jig bodies with integrally formed hooks.
Figure 2:
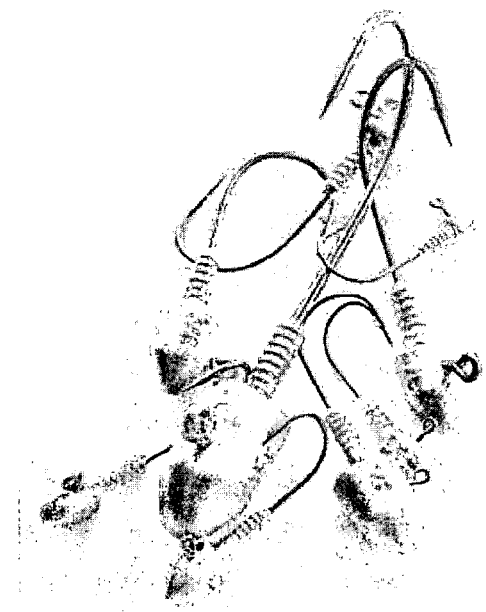
Figure 3:
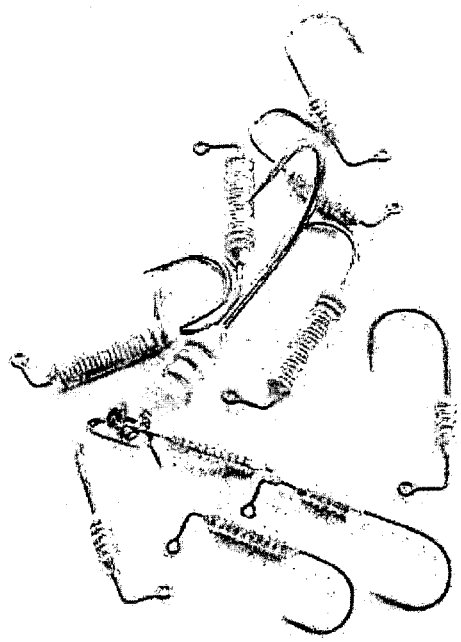
Figure 4:
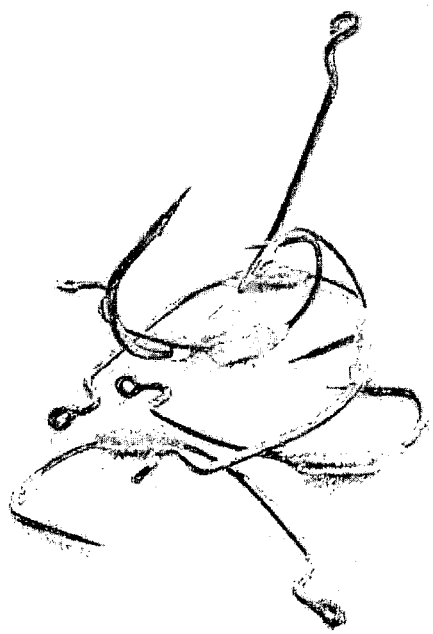

According to one particularly preferred embodiment of the present invention, a jig body 10 is provided.

The jig body 10 illustrated in FIGS. 5 to 12 is adapted to mount a soft plastic lure (not shown) relative thereto. Each of the two embodiments illustrated includes an elongate shank 11, a line attachment eyelet 12 relative to a first end of the elongate shank 11, an elongate hook mounting eyelet 13 at the opposite end of the shank 11, a soft plastic lure retention portion 14, and at least one portion of positive or negative buoyancy.

The elongate shank 11 of the jig body 10 illustrated is of unitary construction, normally manufactured of wire in order to be substantially rigid but still have an element of resilience.

The elongate shank 11 is substantially straight and an upturned forward end 15 provided at an angle to the main body of approximately 60[deg.] from the plane of the main body. The upturned forward end 15 lies in the same plane as the remainder of the elongate shank 11 when viewed from above as illustrated in FIGS. 6 and 10.

The elongate shank 11 is provided with a retaining portion to retain or position the soft plastic lure retention portion 14 relative to the elongate shank 11.

The alternative embodiments of the invention illustrated in FIGS. 5 to 8 and FIGS. 9 to 12 differ only in the configuration of the retaining portion. The embodiment of the invention illustrated in FIGS. 5 to 8 illustrates a retaining portion in the form of a bend or kink 16' in the elongate shank 11 and the embodiment of the invention illustrated in FIGS. 9 to 12 has a retaining portion in the form of a squashed or flattened portion 16" of the elongate shank 11.

Regardless of which of the two preferred embodiments of retaining portion 16 are provided, the retaining portion 16 is provided toward the head end of the elongate shank 11 but spaced from the head end, typically located at a position one quarter to one third of the length of the shank from the head end.

The illustrated jig body 10 includes a line attachment eye 12 at a first end of the elongate shank 11. Typically, the line attachment eye 12 is used to attach portion of fishing line or other attachment device in order to attach the jig body 10 relative to an elongate fishing line.

The line attachment eye 12 illustrated is formed integrally with the shank 11, with the forward free end of the shank bent back on itself to define the opening. The line attachment eye 12 is formed in the same plane as the remainder of the elongate shank 11 when view from above as illustrated in FIGS. 6 and 10.

The line attachment eye 12 is provided at the end of the upturned forward end portion 15.

The hook mounting eye 13 is provided at the end of the elongate shank 11 opposite the line attachment eye 12.

Figure 13:
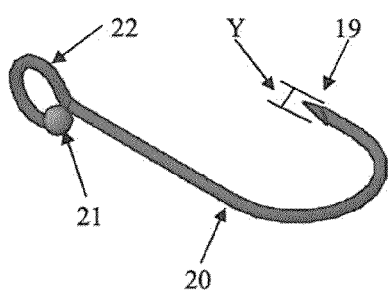
FIGS. 13 to 16 are a series of different views of a hook according to an embodiment of the present invention.
Figure 14:
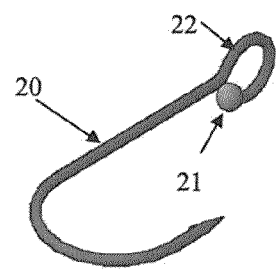
Figure 15:
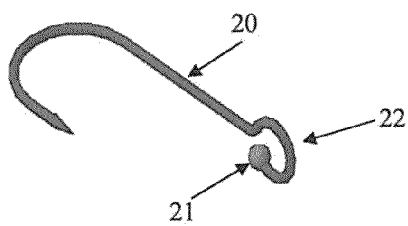
Figure 16:
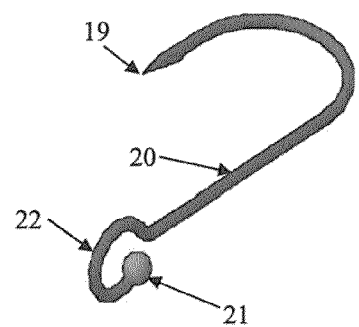

According to the preferred embodiment illustrated, the hook mounting eye 13 includes an elongate opening of fixed dimension. The eye 13 is dimensioned and adapted to receive and pass a hook (such as is illustrated in FIGS. 13 to 16) with a barb therethrough provided that the barb of the hook is aligned with the elongate dimension (X) of the eye.

The hook mounting eye 13 is formed integrally with the elongate shank 11 by bending the elongate shank back upon itself. As with the line attachment eye 12, the eye has an opening with a closed or substantially closed periphery.

Again, the hook mounting eye 13 is formed so that it is coplanar with the elongate shank 11 when viewed from above.

As mentioned above, the soft plastic lure retention portion 14 is formed over the retaining portion 16 of the shank. The soft plastic lure retention portion is over moulded in order that the retention portion on the shank fixes the position of the soft plastic lure retention portion.

The soft plastic lure retention portion 14 may be provided with barbs 17 or similar in order to allow forced passage of the elongate shank 11 or at least a portion thereof through a soft plastic lure but to prevent removal of the soft plastic lure from the jig body 10.

As illustrated, the barbs 17 are provided diverging in the forward direction so that the soft plastic lure can be forced on to the jig body 10 from the rear but not removed from the rear for example such as when a fish strikes. There is one larger barb 17' and one smaller barb 17" provided, the larger barb 17' provided facing upwardly in substantially the same plane as the upturned forward end of the shank and the smaller barb 17" is provided facing downwardly in substantially the same plane.

At least one portion of positive or negative buoyancy is provided in the illustrated embodiment as material attached to the jig body more or less permanently.

A portion of positive or negative buoyancy (a head portion 18) is provided overmoulded about the upstanding forward end 15 of the shank leaving the tine attachment eye 12 unobstructed.

The head portion 18 of positive or negative buoyancy is shaped to resemble the head of a bait fish from the side or alternatively, can be shaped to reduce drag in a forward direction to ease retrieval of the assembled lure.

According to the illustrated embodiment, the soft plastic retaining portion 14 is formed as a portion of positive or negative buoyancy as well.

According to the particular embodiment illustrated in FIGS. 13 to 16 the hook used with the jig described above has a forward point 19 with a barb, an elongate shank 20 and a blind eye 21 including an enlarged portion at the opposite end of the elongate shank from the forward point 19.

Normally, a portion of the shank 20 is arcuate or curved with the point 19 of a hook located at the free end of the curved portion. The blind eye 21 is provided at the opposite end of the shank 20 to the point 19.

The blind eye 21 is provided at the end of an arcuate portion 22 which is oriented approximately perpendicularly to the plane of the shank 20 and the point 19 which are normally in substantially the same plane or only very slightly offset from one another.

The blind eye 21 of the hook is typically configured as an enlarged portion designed to allow passage of the point and shank through an eye or similar opening and the enlarged portion prevents complete passage of the shank through the eye by abutting the periphery of the hook mounting eye 13.

Typically, the hook of this nature is attached to the hook mounting eye 13 on the preferred jig body 10 by orienting the barb associated with the hook point 19 with the long dimension of the elongate eye 13 and then pushing the remainder of the shank through the eye 13 until the enlarged bulb abuts the periphery of the eye 13. Unless the barb of the hook is aligned with the long dimension, passage of the barb though the eye 13 is not possible due to the dimension Y. This will allow a user to swap the hook on the jig relatively easily but be confident that the hook will not accidentally come loose. Similarly, the enlarged bulb will not allow the hook to pass completely. The dimension X of the hook mounting eye 13 will normally be only slightly larger than the dimension Y of the barb and hook point 19.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

The claims defining the invention are as follows:

1. A jig body adapted to at least temporarily mount a soft plastic lure relative thereto, the jig body including:
    an elongate shank,
    a line attachment portion relative to a first end of the elongate shank,
    a hook mounting means along the length of the shank,
    a retaining portion along the length of the shank,
    a soft plastic lure retention portion, and
    at least one portion of positive or negative buoyancy,
    wherein the retaining portion is provided in order to retain and position the soft plastic lure retention portion relative to the elongate shank, and
    wherein the soft plastic lure retention portion and the at least one portion of positive or negative buoyancy are spaced apart and separate from one another along the length of the jig body such that the elongate shank is bare of a bridging portion between the soft plastic lure retention portion and the at least one portion of positive or negative buoyancy.

2. A jig body as claimed in claim 1 wherein the elongate shank of the jig body is of unitary construction.

3. A jig body as claimed in claim 1 wherein the elongate shank has a substantially straight main body with the first end located at an angle to the main body between 30° and 70° from a plane of the main body.

4. A jig body as claimed in claim 1 wherein the retaining portion is a squashed or flattened portion of the elongate shank.

5. A jig body as claimed in claim 1 wherein the line attachment portion is formed integrally with the shank, with the first end of the shank bent back on itself to define an opening.

6. A jig body as claimed in claim 1 wherein the line attachment portion is provided at the first end of the shank.

7. A jig body as claimed in claim 1 wherein the hook mounting means includes an elongate opening with one dimension larger than another dimension, the larger dimension adapted to receive and pass a hook with a barb therethrough when aligned and to prevent removal of the hook with the barb when not aligned.

8. A jig body as claimed in claim 1 wherein the hook mounting means is formed integrally with the elongate shank by bending the elongate shank back upon itself.

9. A jig body as claimed in claim 1 wherein the soft plastic lure retention portion is formed over the retaining portion of the shank using an over moulding technique.

10. A jig body as claimed in claim 1 wherein the soft plastic lure retention portion is provided with at least one barb or similar structure in order to allow forced passage of at least a portion of the elongate shank through a soft plastic lure, but to prevent removal of the soft plastic lure from the fig body in a direction opposite the direction of forced passage.

11. A jig body as claimed in claim 10 wherein any barbs or similar structure that are provided, are provided facing in a single direction towards the first end.

12. A jig body as claimed in claim 1 wherein the at least one portion is provided at or adjacent the first end of the elongate shank leaving the line attachment portion unobstructed.

13. A jig body as claimed in claim 1 wherein the soft plastic lure retention portion has a positive or negative buoyancy.

14. A jig body as claimed in claim 1 wherein all portions of the jig body are formed integrally and in a same plane when viewed from above.

15. A jig body and hook assembly, the jig body adapted to at least temporarily mount a soft plastic lure relative thereto including:
    an elongate shank,
    a line attachment portion relative to a first end of the elongate shank,
    a hook mounting means along the length of the shank,
    a retaining portion along the length of the elongate shank of the jig body,
    a soft plastic lure retention portion, and
    at least one portion of positive or negative buoyancy, and
    a hook having:
        a forward point,
        an elongate shank, and
        a blind eye including an enlarged portion spaced along the elongate shank of the hook from the forward point,
    wherein the retaining portion is provided in order to retain and position the soft plastic lure retention portion relative to the elongate shank of the jig body, and
    wherein the soft plastic lure retention portion and the at least one portion of positive or negative buoyancy are spaced apart and separated from one another along the length of the jig body such that the elongate shank is bare of a bridging portion between the soft plastic lure retention portion and the at least one portion of positive negative buoyancy.

16. A jig body and hook assembly as claimed in claim 15 wherein the blind eye is provided at an opposite and of the elongate shank of the hook to the forward point.

17. A jig body and hook assembly as claimed in claim 15 wherein an arcuate portion oriented approximately perpendicular to a bottom plane of the elongate shank of the hook is provided at the end of the elongate shank of the hook opposite the forward point and the blind eye is provided on the arcuate portion.

* * * * *